Jan. 16, 1951     A. OFFNER     2,538,209

CORRECTED VIEW FINDER OPTICAL SYSTEM

Filed April 29, 1947

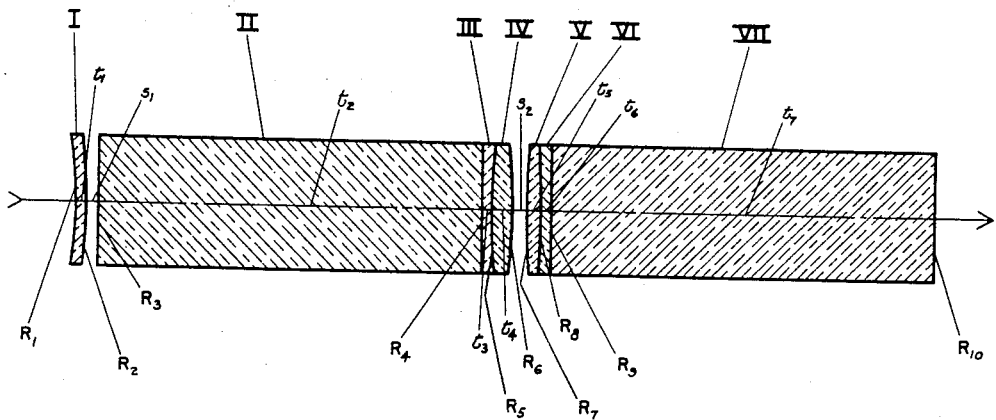

F = 7.620"

| LENS | GLASS | RADII | SPACINGS |
|---|---|---|---|
| I | $N_D = 1.611$<br>$V = 58.8$ | $R_1 = -3.053"$ | $t_1 = .080"$ |
|  |  | $R_2 = -4.066"$ | $s_1 = .100"$ |
| II | $N_D = 1.621$<br>$V = 36.2$ | $R_3 = \infty$ (PLANE) | $t_2 = 3.000"$ |
| III | $N_D = 1.621$<br>$V = 36.2$ | $R_4 = \infty$ (PLANE) | $t_3 = .080"$ |
| IV | $N_D = 1.523$<br>$V = 58.6$ | $R_5 = +5.037"$ | $t_4 = .157"$ |
|  |  | $R_6 = -4.496"$ | $s_2 = .115"$ |
| V | $N_D = 1.523$<br>$V = 58.6$ | $R_7 = +6.750"$ | $t_5 = .118"$ |
| VI | $N_D = 1.621$<br>$V = 36.2$ | $R_8 = -7.555"$ | $t_6 = .080"$ |
| VII | $N_D = 1.621$<br>$V = 36.2$ | $R_9 = \infty$ (PLANE) | $t_7 = 3.000"$ |
|  |  | $R_{10} = \infty$ (PLANE) |  |

*INVENTOR:*
*ABE OFFNER*
BY *Otto J. Nathansohn*
*AGENT*

Patented Jan. 16, 1951

2,538,209

UNITED STATES PATENT OFFICE 2,538,209

CORRECTED VIEW FINDER OPTICAL SYSTEM

Abe Offner, Stamford Conn., assignor to J. A. Maurer, Inc., Long Island City, N. Y., a corporation of New York Application April 29, 1947, Serial No. 744,564

6 Claims. (Cl. 88—57)

This invention relates to view finders, and particularly to view finders used with motion picture cameras.

More specifically, the invention relates to view finders of the type in which a real reduced image is formed by an optical system, and in which this image is observed either directly or through a magnifier. A prism system is ordinarily incorporated in these view finders so that the observed image is erect and correct right-to-left.

In such optical systems, the size of the real image is proportional to the focal length of the optical system so that it is desirable to employ long focus optical systems. Since the various lens aberrations are also proportional to the focal length of an optical system, it is important that such systems be well corrected.

It is, accordingly, an object of the invention to provide an optical system particularly suitable for view finders of the type described.

It is, moreover, an object of the invention to provide such an optical system which is well corrected and has a substantially flat field.

Another object of the invention is to provide such an optical system in which the number of surfaces at which undesired reflections can occur, is reduced to a minimum.

Another object of the invention is to provide such an optical system which is inexpensive and easy to manufacture.

Still other objects and advantages of the invention include those which are hereinafter stated or apparent, or which are incidental to the invention.

The objects of the invention are achieved by employing an optical system whose front element is a simple negative lens. The positive power of the system is concentrated in a chromatically corrected member which is at a considerable distance from the negative lens. Achromatization of the entire system is achieved by substantially filling the space between the negative lens and the positive member with a plane-parallel glass plate or an optical equivalent of such a plate as, for example, a prism.

More particularly, the front negative lens serves to flatten the field of the system. To that end, it must have a focal length not greater than four times the focal length of the entire optical system, and that is why it must be at a considerable distance from the positive member.

Such a lens would require steeply curved surfaces if it were to be corrected for color in the usual manner. This would limit the aperture attainable with the entire system, and also would make it difficult to obtain a high degree of correction. The employment, on the other hand, of an unachromatized element at a considerable distance from its other elements would impair the usefulness of an optical system of the type under discussion. This is so because long focus camera view finder systems must form color-corrected real images of objects whose distances from the view finder range from, say, five times their focal length to very great distances.

In the optical system according to the invention, color correction is obtained because the front negative lens—which is a simple element and hence, in itself, is not corrected for color—is adjacent to the first surface of a plane-parallel plate of glass. This surface substantially corrects the color aberrations of the negative lens, which means that an observer in the glass plate would see a substantially color free image.

This state of color correction is upset at the second surface of the plane-parallel plate. But, since the positive member of the optical system is closed to that second surface, the system can now be corrected for color in the usual way. In so far as chromatic aberrations are concerned, the negative lens and the plane-parallel plate thus act like an undercorrected element situated at the second surface of the plane-parallel plate.

In the foregoing summary of the invention, and throughout this specification, the term "front element" denotes the element on the object side of the optical system, and the term "simple element" denotes a single lens element.

The invention will be better understood when the following description is considered with the accompanying drawing whose single figure shows, by way of example, a presently preferred embodiment thereof.

The optical system according to the invention is shown in cross-section, and has the following specifications which correspond to the table accompanying the drawing:

[F=7.620″]

| Lens | Glass | Radii | Spacings |
|---|---|---|---|
| I | $N_D$= 1.611<br>V =58.8 | $R_1$ =−3.053″<br>$R_2$ =−4.066″ | $t_1$= .080″<br>$s_1$= .100″ |
| II | $N_D$= 1.621<br>V =36.2 | $R_3$ =∞ (plane)<br>$R_4$=∞ (plane) | $t_2$=3.000″ |
| III | $N_D$= 1.621<br>V =36.2 | $R_5$ =+5.037″ | $t_3$= .080″ |
| IV | $N_D$= 1.523<br>V =58.6 | $R_6$ =−4.496″ | $t_4$= .157″ |
| V | $N_D$= 1.523<br>V =58.6 | $R_7$ =+6.750″<br>$R_8$ =−7.555″ | $s_3$= .115″<br>$t_5$= .118″ |
| VI | $N_D$= 1.621<br>V =36.2 | $R_9$ =∞ (plane) | $t_6$= .080″ |
| VII | $N_D$= 1.621<br>V =36.2 | $R_{10}$=∞ (plane) | $t_7$=3.000″ |

Lens I is a simple negative lens, while the positive member of the optical system consists of the two lenses III, IV and V, VI. Each of lenses III, IV and V, VI has an outer plane surface, $R_4$ and $R_9$, respectively, and an outer convex surface, $R_6$ and $R_7$, respectively. Surfaces $R_6$ and $R_7$ face each other, while the plane surface $R_4$ of lens III, IV is adjacent to the plane-parallel glass plate II and the plane surface $R_9$ of lens V, VI is adjacent to the plane-parallel glass plate VII. This makes it possible to cement lens III, IV to plate II, and to cement lens V, VI to plate VII, thereby reducing the number of surfaces at which undesired reflections can occur.

With this form of positive member, the front negative lens I must be a meniscus concave to the object in order to correct the system for spherical aberration, coma, field curvature, and distortion.

Plane-parallel plate II substantially fills the space between the front negative lens I and the positive member III, IV, V, VI. Its thickness $t_2$ is, in the example shown, about four-tenths of the focal length of the optical system, but the advantages of the invention may also be had with the value of $t_2$ being as little as one-third of the focal length of the optical system.

In the example shown, front negative lens I is made of glass of relatively low dispersion, its reciprocal dispersive power being 58.8, and the achromatizing plane-parallel plate II is made of glass of relatively high dispersion, its reciprocal dispersive power being 36.2. In order to reap the full benefits of the invention, it is desirable that the reciprocal dispersive power of the glass of lens I be greater than 54, and that of the glass of plate II be less than 45. At least a partial achromatization of lens I, however, will result from any combination of glasses.

In case it is desired to employ as parts of the optical system the well known prisms for derotating the real image so that it is erect and correct left-to-right when viewed, one prism may replace plate II as its optical equivalent and the other prism may replace plate VII as its optical equivalent; the above specifications pertaining to such an arrangement. Alternatively, both prisms may be placed between front negative lens I and positive member III, IV, V, VI, in which case the two prisms together must meet the specifications of plate II while plate VII may be omitted from the optical system.

What is claimed is:

1. An optical system for forming a real reduced image of an object and comprising a front element which is a simple negative lens situated at a position other than an image plane, a positive member made up of a plurality of lens elements, and a plane-parallel member substantially filling the space between said front element and said positive member; said plane-parallel member having a first surface facing said front element and a second surface facing said positive member, said positive member being chromatically corrected for itself and for the color aberrations occurring at said second surface, and the distance within said plane-parallel member of said second surface from said first surface being at least one third the focal length of said system.

2. An optical system according to claim 1 and in which the focal length of said front element is at most four times and at least one third the focal length of said system.

3. An optical system according to claim 1 and in which said positive member includes at least one lens having an outer plane surface and being cemented to said plane-parallel member.

4. An optical system according to claim 1 and in which said positive member consists of two lenses having each an outer plane surface; one of said last mentioned two lenses being cemented to said plane-parallel member.

5. An optical system according to claim 4 and in which said front element is a meniscus concave to said object.

6. An optical system for forming a real reduced image of an object and having approximately the following specifications:

[F=7.620″]

| Lens | Glass | Radii | Spacings |
|---|---|---|---|
| I | $N_D$= 1.611<br>V =58.8 | $R_1$ =−3.053″<br><br>$R_2$ =−4.066″ | $t_1$= .080″<br><br>$s_1$= .100″ |
| II | $N_D$= 1.621<br>V =36.2 | $R_3$ =∞ (plane)<br><br>$R_4$ =∞ (plane) | $t_2$=3.000″ |
| III | $N_D$= 1.621<br>V =36.2 | <br>$R_5$ =+5.037″ | $t_3$= .080′ |
| IV | $N_D$= 1.523<br>V =58.6 | <br>$R_6$ =−4.496″<br>$R_7$ =+6.750″ | $t_4$= .157″<br><br>$s_2$= .115″ |
| V | $N_D$= 1.523<br>V =58.6 | <br>$R_8$ =−7.555″ | $t_5$= .118″ |
| VI | $N_D$= 1.621<br>V =36.2 | <br>$R_9$ =∞ (plane) | $t_6$= .080″ |
| VII | $N_D$= 1.621<br>V =36.2 | <br>$R_{10}$=∞ (plane) | $t_7$=3.000″ | where the Roman numerals refer to elements starting with the front side of the optical system, $N_D$ is the index of refraction with reference to the D line of the spectrum, V is the dispersive index, $R_1$ to $R_{10}$ are the radii of curvature of the refractive surfaces consecutively from front to rear, the + and − signs referring respectively to surfaces convex and concave to the front, $t_1$ to $t_7$ are the axial thicknesses of the elements, $s_1$ and $s_2$ are the air space thicknesses between the elements I and II, and IV and V, respectively, and F is the focal length of the optical system, the contacting surfaces of the elements II, III and IV, and V, VI and VII, respectively, being cemented.

ABE OFFNER.

REFERENCES CITED

The following references are of record in the file of this patent:

UNITED STATES PATENTS

| Number | Name | Date |
|---|---|---|
| 488,506 | McIllwain | Dec. 20, 1892 |
| 874,049 | Borsch | Dec. 17, 1907 |
| 1,339,386 | Ham | May 11, 1920 |
| 1,687,030 | Mitchell | Oct. 9, 1928 |
| 2,015,527 | Konig | Sept. 24, 1935 |
| 2,221,609 | Sanger | Nov. 12, 1940 |
| 2,346,002 | Bennett | Apr. 4, 1944 |
| 2,423,267 | Strang | July 11, 1947 |
| 2,423,676 | Altman | July 8, 1947 |